United States Patent [19]
Irie

[11] Patent Number: 5,714,859
[45] Date of Patent: Feb. 3, 1998

[54] SERVO CONTROL APPARATUS FOR A MOTOR

[75] Inventor: Toshiaki Irie, Daito, Japan

[73] Assignee: Funai Electric Co., Ltd., Osaka, Japan

[21] Appl. No.: 506,480

[22] Filed: Jul. 25, 1995

[30] Foreign Application Priority Data

Jul. 25, 1994 [JP] Japan .................. 6-172581

[51] Int. Cl.$^6$ .................................................. G05D 3/12
[52] U.S. Cl. .................. 318/561; 318/568.22; 318/608; 318/609
[58] Field of Search .................. 318/560, 561, 318/563, 568.18, 568.22, 599, 600–610, 810, 809, 811, 150; 364/161, 162; 388/804, 811

[56] References Cited

U.S. PATENT DOCUMENTS

| | | | |
|---|---|---|---|
| 4,514,672 | 4/1985 | O'Gwynn | 318/616 |
| 4,910,448 | 3/1990 | Tomisawa et al. | 318/599 |
| 4,990,840 | 2/1991 | Migda | 318/571 |
| 5,384,525 | 1/1995 | Kato | 318/610 |
| 5,475,291 | 12/1995 | Yoshida et al. | 318/568.22 |
| 5,510,996 | 4/1996 | Kuhn et al. | 318/567 X |
| 5,519,297 | 5/1996 | Kono et al. | 318/594 |
| 5,598,077 | 1/1997 | Matsubara et al. | 318/568.22 |

*Primary Examiner*—Brian Sircus
*Attorney, Agent, or Firm*—Bacon & Thomas

[57] ABSTRACT

A servo control apparatus for controlling a rotation speed of a motor such as a capstan motor or a drum motor for a video tape recorder. In the servo control apparats, a control value generating unit generates a control value on the basis of a difference between the rotation speed of the motor detected by a rotation speed detecting unit and a desired value of the rotation speed. When a deviation value representing a difference between the control value generated by the control value generating unit and an ideal control value representing an ideal value of the control value is constant for a predetermined period of time, an error state monitoring unit outputs the deviation value. An adding unit adds the control value generated by the control value generating unit with the deviation value to obtain a result of addition, and a drive voltage generating unit drives the motor by a drive voltage according to the result of addition from the adding unit.

6 Claims, 2 Drawing Sheets

SERVO CONTROL APPARATUS FOR A MOTOR

BACKGROUND OF THE INVENTION

1. Field of the Invention

The present invention relates to a servo control apparatus for controlling a rotation speed of a motor such as a capstan motor or a drum motor for a video tape recorder and, more particularly, to a servo control apparatus for a motor which applies a deviation value to a control value generated based on an error.

2. Description of the Related Art

In the related art for performing the servo control of a motor such as a capstan motor for a video tape recorder, the rotation speed of the motor is detected in the form of a rotation period thereof, and then a control value representing a duty ratio of pulse width modulation (PWM) is generated through digital processing of a difference between the detected rotation period and a desired period. The generated duty ratio is supplied to a PWM unit for performing the PWM control for the motor in accordance with the duty ratio. The output of the PWM unit is converted into a DC output by a filter, amplified by an amplifier and then supplied to the motor.

However, when a cheap capacitor such as a ceramic capacitor or the like is employed as a capacitor forming the filter connected to the PWM unit, a large leak current is caused by the ceramic capacitor so that the output of the filter is largely influenced by the leak current. Accordingly, there arises a slight difference between the duty ratio supplied to the PWM unit and the output of the amplifier supplied to the motor due to the aforesaid influence to the filter, a leak current of the amplifier, an offset and the like.

The duty ratio (control value) based on the difference between the detected rotation period and the desired value thereof is generated through digital processing. In other words, the control value is generated on the assumption that a drive voltage generating unit formed by the PWM unit, filter and amplifier operates without causing any error.

Accordingly, when the rotation period of the motor approaches to a desired period quite closely and the servo control shifts to a balanced state, a control loop or a closed loop is balanced with a slight difference between the duty ratio supplied to the PWM unit and the output of the amplifier. As a result, there has arose a problem that the rotation period of the motor does not coincide with a predetermined period and hence the slight error or difference can not be corrected.

SUMMARY OF THE INVENTION

Accordingly, an object of the present invention is to provide a servo control apparatus for a motor in which a control value generated based on an error is applied with a deviation value which is generated in accordance with a difference between the thus generated control value and an ideal control value so that the rotation speed of the motor can be coincident with a desired value with high accuracy without being influenced by accuracy of a drive voltage generating unit for driving the motor.

In order to attain the above object, the present invention provides a servo control apparatus for a motor, including a rotation speed detecting unit for detecting a rotation speed of the motor and a control value generating unit for generating a control value on the basis of a difference between the rotation speed detected by the rotation speed detecting unit and a desired value of the rotation speed. An error state monitoring unit monitors the control value and when a deviation value representing a difference between the control value and an ideal control value is constant for a predetermined period of time, outputs the deviation value to an adding unit which adds the control value to the deviation value. A voltage generating unit then drives the motor according to the result of the addition.

DETAILED DESCRIPTION OF THE PREFERRED EMBODIMENT

A servo control apparatus for a motor according to an embodiment of the present invention will now be described with reference to the drawings.

Figure 1:
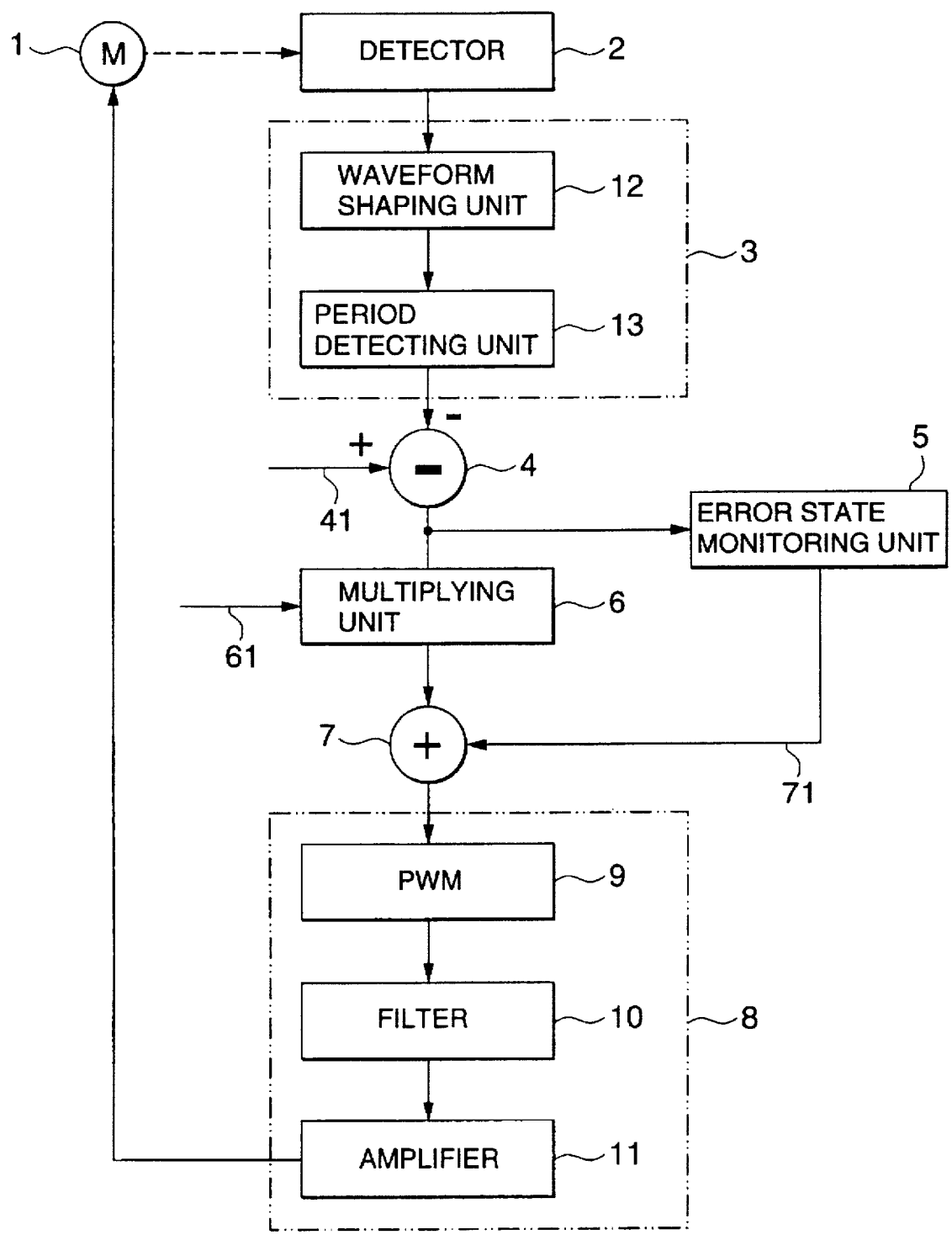
FIG. 1 is a block diagram showing an arrangement of a servo control apparatus for a motor according to an embodiment of the present invention.
Figure 2:
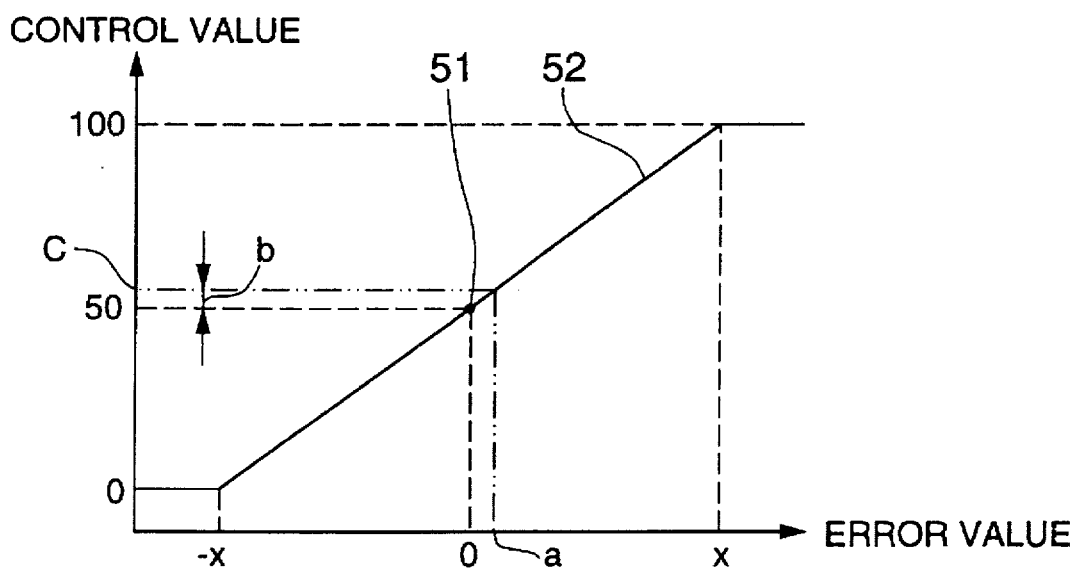
FIG. 2 is a diagram used for explaining a relation between an error value of the rotation period of a motor and a control value.

FIG. 1 is a block diagram showing an arrangement of the servo control apparatus for a motor according to the embodiment of the present invention. FIG. 2 is a diagram used for explaining a relation between an error value of the rotation period of a motor and a duty ratio (control value).

Referring to FIG. 1, a motor 1 is a capstan motor for a video tape recorder. A detector 2 is a function block for converting the rotation of the motor 1 into an electric signal in a manner that a sinusoidal waveform signal of 360 cycles is generated at every rotation of the motor 1.

A rotation speed detecting unit 3 is a function block for detecting a rotation speed of the motor 1 based on the output signal of the detector 2. That is, the rotation speed detecting unit 3 is formed by a waveform shaping unit 12 and a period detecting unit 13, and detects the rotation speed of the motor 1 in the form of a rotation period thereof to thereby output a result of the detection as a digital value representing the rotation period.

To be more concrete, the waveform shaping unit 12 is a function block for amplifying the sinusoidal waveform signal outputted from the detector 2 and then shaping the waveform of the amplified sinusoidal waveform signal. The period detecting unit 13 is a counter formed by a central processing unit (CPU) operated by a high-speed clock signal and software. Alternatively, the period detecting unit 13 may be a counter formed by an exclusively designed hardware. The period detecting unit 13 starts the counting operation when, for example, a rising edge appears in the output signal of the waveform shaping unit 12 and stops the counting operation when the succeeding rising edge appears to thereby output the count value at this time as a value representing the rotation period. Further, at this time, the period detecting unit 13 resets the count value and starts the counting operation again.

A control value generating unit 4 is a function block for generating a control value based on a difference between the rotation speed detected by the rotation speed detecting unit 3 and a desired period value 41 representing a desired value of the rotation speed. That is, the control value generating unit 4 generates a control value representing a duty ratio on the basis of the difference between the rotation period in the form of a digital value detected by the rotation speed generating unit 3 and the desired period value 41 representing the desired speed value.

To be more concrete, when a rotation period represented by the desired period value 41 is 1/700, for example, a rotation period representing an error value will be 1/700 as shown in FIG. 2. That is, When the rotation period outputted from the rotation speed detecting unit 3 is 1/700, for example, the control value generating unit 4 generates a duty ratio of 50% as the control value. When the rotation period outputted from the rotation speed detecting unit 3 is longer than 1/700, the control value generating unit 4 generates a duty ratio which is made larger than 50% by an amount corresponding to the increment of the rotation period. In contrast, when the rotation period is shorter than 1/700, the control value generating unit 4 generates a duty ratio which is made smaller than 50% by an amount corresponding to the decrement of the rotation period.

A multiplying unit 6 is a function block for multiplying the control value in accordance with a mode output signal 61 instructing a running speed of a video tape and outputting a result of the multiplication to an adding unit 7. To be more concrete, when the mode output signal 61 represents a normal speed mode, the multiplying unit 6 multiplies the control value generated by the control value generating unit 4 by one. That is, the multiplying unit 6 does not change the control value generated by the control value generating unit 4. When the mode output signal 61 represents a double speed mode and the control value generated by the control value generating unit 4 is X%, the multiplying unit 6 performs a calculation of (X−50)×2+50, and outputs a result of the calculation to the adding unit 7. In other words, in the double speed mode, a straight line 52 representing the relation between an error value and a control value shown in FIG. 2 is rotated around a point 51 so as to have twice the inclination thereof. Accordingly, in the double speed mode, a rotation period shown by the error value "0" will be 1/1,400.

An error state monitoring unit 5 is a function block for, at the time of setting an output signal 71 thereof to be 0%, when a deviation value representing a difference between an ideal control value (50% in the example of FIG. 2) representing an ideal value of the control value and a control value generated by the control value generating unit 4 is constant for a predetermined period of time, outputting the deviation value to the adding unit 7.

To be more concrete, in a case where the control value generated by the control value generating unit 4 is 53%, when a deviation value 3% does not change for the predetermined period of time, for example, 100 msec since this control value is generated during a balanced state of a control loop or a closed loop, this value of 3% will be sent to the adding unit 7 as the deviation value.

The adding unit 7 is a function block for adding the deviation value outputted from the error state monitoring unit 5 with the output of the multiplying unit 6 and outputting a result of the addition to a drive voltage generating unit 8.

The drive voltage generating unit 8 is a function block for driving the motor 1 by a control output (drive voltage) according to the result of the addition outputted from the adding unit 7. To be concrete, the drive voltage generating unit 8 is formed by a pulse width modulating (PWM) unit 9, a filter 10 and an amplifier 11, and supplies the drive voltage according to a duty ratio from the adding unit 7 to the motor 1.

That is, the PWM unit 9 generates a current according to the duty ratio outputted from the adding unit 7, and the filter 10 converts the output current from the PWM unit 9 into a DC component. The amplifier 11 amplifies the output of the filter 10.

Since these blocks 9, 10 and 11 are formed by quite cheep elements, an error according to the elements employed therein is contained between the duty ratio supplied from the adding unit 7 and the drive voltage supplied to the motor 1.

An operation of the thus configured servo control apparatus for a motor according to the embodiment will be described.

When the mode output signal 61 represents the normal speed mode, the deviation value 71 of the error state monitoring unit 5 is 0% at the time of starting the control. Thus, the motor 1 is controlled by the closed loop formed of the detector 2, rotation speed detecting unit 3, control value generating unit 4 and drive voltage generating unit 8, so that the closed loop is placed in the balanced state at a certain rotation period. In this case, it is assumed that the rotation period of the motor 1 is longer than the desired value (that is, a rotation period at the time of an error value 0) by a due to the influence of a leak current or the like, so that the control value becomes c% which is larger than the ideal control value 50% by a value b%.

The error state monitoring unit 5 always monitors a deviation value which is a difference between the control value outputted from the control value generating unit 4 and the ideal control value 50%. When the closed loop is balanced at the error value a of the rotation period of the motor 1 and the control value c%, the deviation value is kept at a constant value b%. Accordingly, when this balanced state is kept for a period of 100 msec, the error state monitoring unit 5 outputs a difference b% between the control value c% outputted from the control value generating unit 4 and the ideal control value 50% as a deviation value to the adding unit 7. As a result, the adding unit 7 adds the control value outputted from the control value generating unit 4 with the difference value b% and then supplies the result of the addition to the drive voltage generating unit 8.

Figure 3:
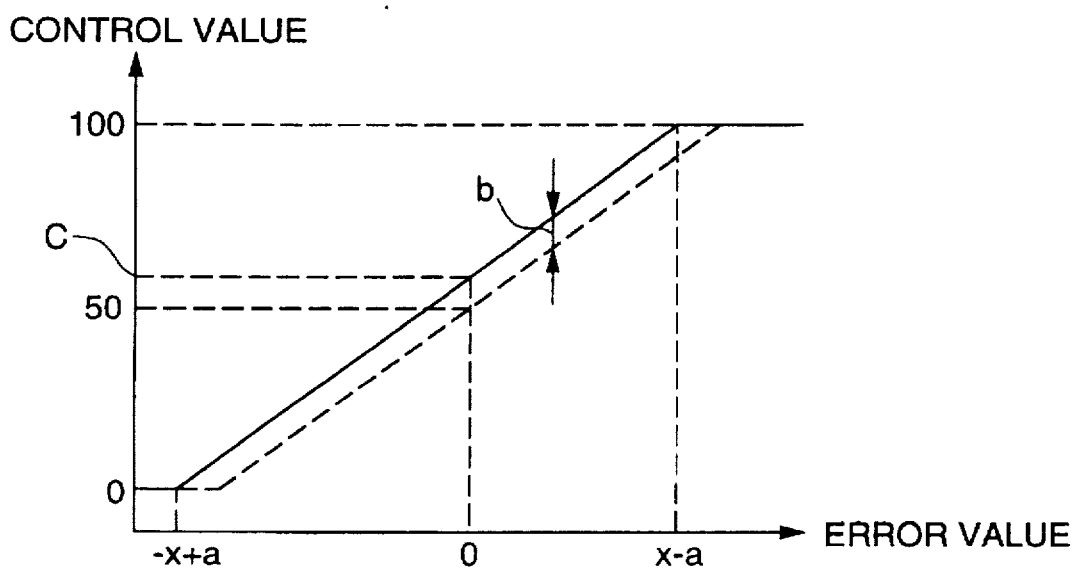
FIG. 3 is a diagram used for explaining a relation between an error value of the rotation period of a motor and a control value which is incremented.

This means that the control value is incremented by b%. Accordingly, the relation between the error value and the duty ratio applied to the drive voltage generating unit 8 is changed, so that the control value corresponding to the error value changes as shown in FIG. 3.

In other words, in order to make an error value representing the difference between the rotation period of the motor 1 and the desired value thereof to be 0, the control value is required to be set to (c%−b%) after the increment of the control value, while it has been required to be set to c% before the increment. Accordingly, when the control value is made 50% coincident with the ideal control value, the rotation period of the motor 1 becomes equal to the desired value, whereby the closed loop is placed in the balanced state.

As a result, the motor 1 rotates with a rotation period coincident with the desired value and hence a capstan provided at the rotary shaft of the motor 1 rotates at a desired speed, so that a video tape is run at a speed coincident with the desired speed.

Thereafter, the error state monitoring unit 5 monitors whether or not the control value deviates from the ideal control value 50%. When the control value deviates from 50%, the error state monitoring unit 5 determines that the balanced state of the closed loop is lost by the disturbance such as change in load of the motor 1, and then sets the deviation value outputted to the adding unit 7 to 0%. Thereafter, the aforesaid operations are repeated.

In other words, when the closed loop of the motor 1 is again placed in a balanced state and further the deviation value between the control value outputted from the control value generating unit 4 and the ideal control value (50%) is kept constant for the predetermined period, the error state monitoring unit 5 outputs the deviation value to the adding unit 7.

The aforesaid operations are performed in the same manner in the case where the mode output signal 61 represents the double speed mode, and the multiplying unit 6 multiplies the control value by two.

While, in the aforesaid embodiment, the capstan motor is employed, the present invention is not limited thereto and may be applied to a drum motor.

Further, while, in the aforesaid embodiment, the motor is driven by the pulse width modulated output, the present invention is not limited thereto and the motor may be driven by a DA (digital-to-analog conversion) output.

Furthermore, the amplifier 11 may be omitted depending on the configuration of the motor 1.

As described above, the servo control apparatus for a motor according to the present invention includes a control value generating unit for generating a control value on the basis of the difference between the rotation speed detected by the rotation speed detecting unit and the desired value of a rotation speed of the motor, and an error state monitoring unit for, when a deviation value representing the difference between the control value and an ideal control value is constant for a predetermined period of time, outputting a deviation value. An adding unit adds the control value generated by the control value generating unit to the deviation value, and the result is used drive voltage generating unit to drive the motor. According to the thus configured servo control apparatus for a motor, even if the closed loop is balanced in a state where the rotation speed deviates from the desired value due to the variations of elements of the drive voltage generating unit, the balanced state is shifted so that the rotation speed at this time coincides with the desired value and hence the closed loop is stably balanced in this state. As a consequence, it is possible to make the rotation speed of the motor coincident with the desired value with high accuracy without being influenced by the accuracy of the motor and the drive voltage generating unit for driving the motor.

What is claimed is:

1. A servo control apparatus for a motor, comprising:

a rotation speed detecting unit for detecting a rotation speed of the motor;

a control value generating unit for generating a control value on the basis of a difference between the rotation speed detected by said rotation speed detecting unit and a desired value of the rotation speed;

an error state monitoring unit for, when a deviation value representing a difference between the control value generated by said control value generating unit and an ideal control value representing an ideal value of the control value is constant for a predetermined period of time, outputting the deviation value;

an adding unit for adding the control value generated by said control value generating unit with the deviation value to obtain a result of addition; and a drive voltage generating unit for driving the motor by a drive voltage according to the result of addition from said adding unit.

2. The servo control apparatus according to claim 1, further comprising a detector for converting a rotation of the motor into an electric signal.

3. The servo control apparatus according to claim 2, wherein said rotation speed detecting unit comprises a waveform shaping unit for shaping a waveform of the electric signal from said detector, and a period detecting unit for performing a counting operation to output a count value on the basis of an output signal from said waveform shaping unit.

4. The servo control apparatus according to claim 1, wherein said drive voltage generating unit comprises a pulse width modulating unit for generating a pulse width modulated signal output according to the result of addition from said adding unit, and a filter for filtering the pulse width modulated output.

5. The servo control apparatus according to claim 1, wherein the motor is a capstan motor used in a video tape recorder.

6. The servo control apparatus according to claim 1, wherein the motor is a drum motor used in a video tape recorder.

* * * * *